Figure 1:
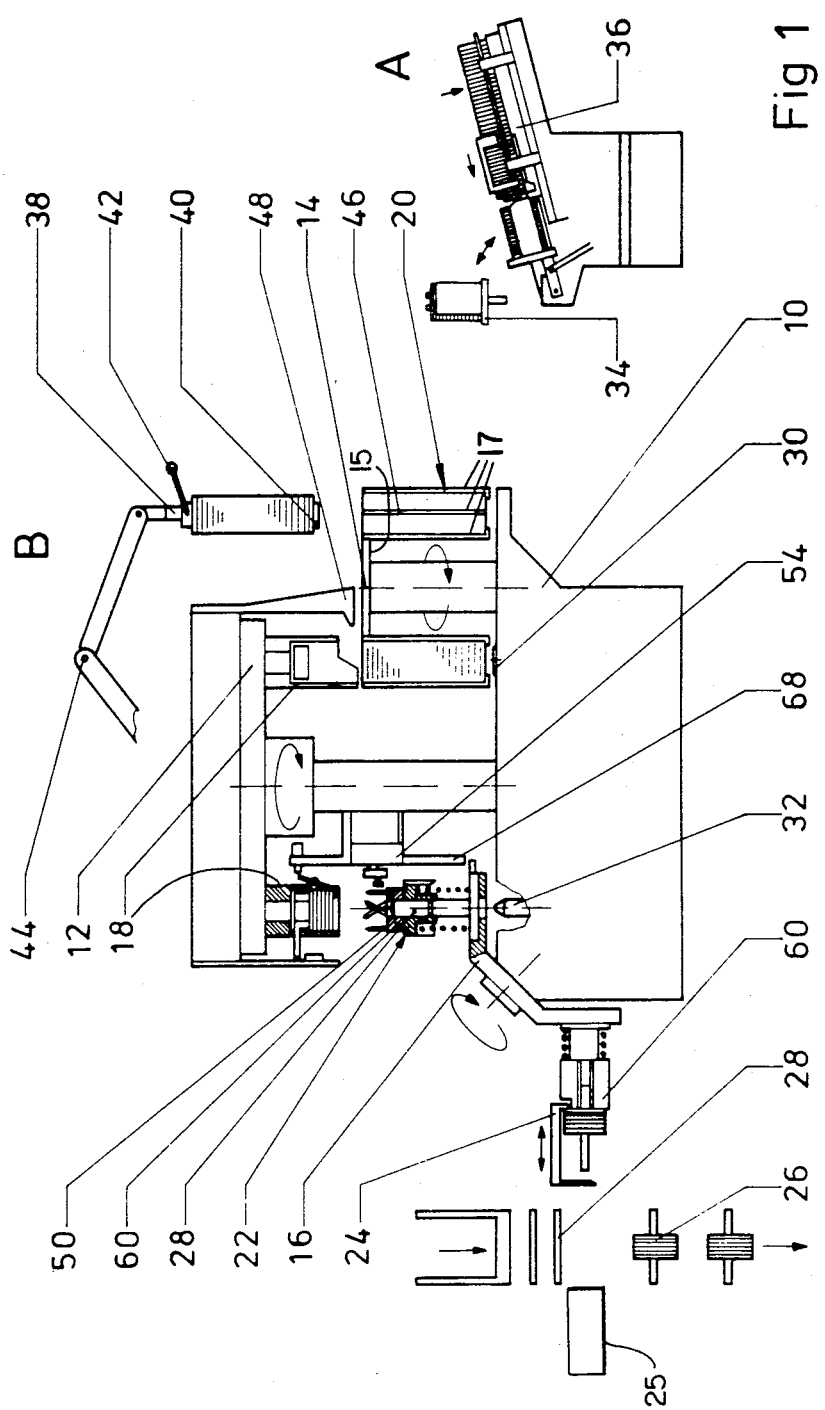

United States Patent [19]

Fichtner

[11] Patent Number: 4,502,589
[45] Date of Patent: Mar. 5, 1985

[54] METHOD AND APPARATUS FOR THE PRODUCTION OF ROTOR AND STATOR SHEET PACKETS FOR ELECTRICAL MACHINES

[75] Inventor: Karl-Heinz Fichtner, Hanau, Fed. Rep. of Germany

[73] Assignee: Balzer and Droll KG, Niederdorfelden, Fed. Rep. of Germany

[21] Appl. No.: 417,350

[22] Filed: Sep. 13, 1982

Related U.S. Application Data

[62] Division of Ser. No. 124,087, Feb. 25, 1980, Pat. No. 4,383,356.

[30] Foreign Application Priority Data

Feb. 24, 1979 [DE] Fed. Rep. of Germany ....... 2907261

[51] Int. Cl.$^3$ .............................................. B65G 47/84
[52] U.S. Cl. ..................... 198/484; 198/653; 198/803; 414/47
[58] Field of Search ..................... 29/732, 738; 414/37, 414/47, 114; 221/121, 122, 132; 198/480, 484, 652, 653, 803, 478, 802

[56] References Cited

U.S. PATENT DOCUMENTS 2,556,214 6/1951 Pottle ..................................... 414/47
4,079,512 3/1978 Lakes ..................................... 29/732
4,202,435 5/1980 Mang et al. ........................... 198/480

FOREIGN PATENT DOCUMENTS 54-25603 8/1979 Japan .

Primary Examiner—Joseph E. Valenza
Assistant Examiner—Jonathan D. Holmes
Attorney, Agent, or Firm—Larson and Taylor

[57] ABSTRACT

A method and apparatus for making packets of rotor or stator sheets for electrical machinery. At a certain station to which a preselected number of sheets are delivered, the sheets are both aligned and joined together. Aligning is effected by an aligning device which includes aligning pins which move into openings in the sheets. While the sheets are still at the aligning station, joining means effect joining together of the sheets. The joining means may include a piston pressed into the opening in the sheets and/or a device for welding the sheets together. At a packet receiving station before the aligning and joining station relatively high stacks of sheets are placed into magazine baskets suspended from a central turntable member. A piston pushes a predetermined number of such sheets upwardly through its respective basket into a receiving head which carries those sheets to the aligning and joining station. The finished packets are then carried by the aligning joining means to a discharging station.

2 Claims, 3 Drawing Figures

METHOD AND APPARATUS FOR THE PRODUCTION OF ROTOR AND STATOR SHEET PACKETS FOR ELECTRICAL MACHINES

This is a division of application Ser. No. 124,087, filed Feb. 25, 1980, now U.S. Pat. No. 4,383,356.

The invention concerns a process and an apparatus for the production of rotor or stator sheet packets for electrical machines, whereby a specific number of stamped sheets are assembled as a packet, aligned radially and in the circumferential direction, and joined to each other by joining means quided axially along the packet.

Previously known methods and devices for this purpose are relatively complicated because the individual work processes are undertaken in succession at various work stations. The difficulties in aligning and joining the sheets result in part from the nature of the prior types and methods of pre-alignment of the sheets before their assembly into packets.

The present invention therefore concerns the problem of creating a process, and a suitable apparatus for its execution, with which the aligning and joining of the sheets will be essentially simplified and speeded up, resulting in fewer operational interruptions.

According to the invention the solution to this problem is achieved by having the joining of the sheets occur in the course of the alignment procedure.

With this arrangement there is a reduction in driving and guiding means, as well as a reduction of space required for such means, because a device for joining the sheets can be disposed at the same work station as the aligning elements. Advantageously at least one aligning element will be introduced into holes or grooves of the sheets, and the sheet joining means will follow behind the aligning element in its axial movement. A combination aligning-joining device advantageously comprises a guide head movable relative to the sheet packet both axially and rotationally, the said guide head forming a centering receiver for the sheet joining means and at the same time acting as a support for the aligning element. The sheet joining means likewise has an advance drive for axial movement thereof relative to the guide head. During operation of this aligning-joining device the sheets are threaded onto a straight or helically bent aligning element which swings in the circumferential direction and moves axially against the stack of sheets. Depending upon whether the sheets have only internal holes or also have at least one outwardly open groove, there may be used rod or needle-formed aligning elements that penetrate into the holes, or external riblike aligning elements that engage in the open grooves. The aligning elements are heilcally bent if the sheets are to be twisted with reference to one another, i.e. if adjacent sheets in the finished stator or rotor are staggered circumferentially with respect to each other by a specific angle.

The new process and apparatus of the present invention can be used if the sheets are to be joined to each other only by a pressed-in shaft, or also if the sheets are first to be welded together, and then thereafter, be further joined by a pressed-in shaft. In the case where the shaft is pressed in immediately, i.e. not preceded by welding, it is advantageously provided that on the same path along which the shafts are brought to the guide head the sheet packets already joined by pressed-in shafts are carried off by a reciprocating push-pull device. This is effected in a preferred practical embodiment in that the guide head cooperates with a charging device in a loading station, whereby in each work cycle a sheet packet with pressed-in shaft can be pulled off from the guide head and pushed onto a conveyer, and that on the reverse path a shaft can be thrust from the conveyor into the guide head.

The WIG welding process can be used in welding the sheets. Heretofore it was difficult to introduce the welding apparatus into the customarily relatively small holes in the sheet packets because the head of the welding device which holds the electrode was relatively large. In order to be able to weld sheet packets with small holes, it is proposed that the known welding apparatus be equipped with an outer tube which can be introduced axially into the hole of the sheets through which protective gas can be delivered to the welding location and with an electrode located within the outer tube and extending essentially radially and clamped at its free end, the said electrode being rendered operable by means of axial pressure applied to it via a rod that extends through the inner tube and against a back-up. The arrangement requires a minimal diameter for the head of the weld apparatus. As a further space saving feature, the back-up may be made as an inner tube extending through the outer tube to simultaneously guide the protective gas with the outer tube and supply current to the electrode.

The attainable speed and the acceptability of precise aligning and joining of the sheets depends to a large extent on how well the sheets are prealigned before or during their feeding in. This prior alignment, which may be partly manual, suffers considerably from the circumstance that the sheets coming from the stamping operation have sharp burrs and are very heavy and hard to manage in fairly high stacks. Because of the speed of the packet assembly process, the two requirements are contradictory, namely that on the one hand the highest and heaviest possible stack be fed into the magazine of the packet assembler and that on the other hand this high stack be readily aligned by hand. The present invention now proposes in the first place that a total content of sheets in a stack height of e.g. about 40 cm or more be fed into the magazine of the packet apparatus or packet station, and that use be made of an auxiliary support, e.g. in the form of a rod on which the sheets are transported while hanging, with balancing, or in the form of a transfer tool on which the sheets lie. The rod or the transfer tool can receive the sheets, if they are not to be further treated, directly at the stamping station. In this case the sheets are already well aligned and can be transferred directly into the magazine of the packet station. Usually heretofore however, the sheets require additional treatment first, e.g. they must be annealed. In this case the sheets arrive in cartons or crates for further processing, whereby immediately after the stamping operation a long thin needle introduced into an off-center hole in the sheet stack holds the sheets in a stack in approximate alignment to each other. The long thin needles are readily deformed elastically into an S during the treatment and transportation of the sheets. For this reason care must be taken, in the simplest possible way before these sheets are made into packets, to have the sheets reach the magazine in as straight an alignment as possible.

To accomplish this, according to the invention, alignment can be done manually on a horizontally disposed or slightly inclined stack which then is taken essentially in the total height of the magazine stack by the rod or the transfer tool. For this purpose, the prealigned sheets are either allowed to shake along a slanted guide on the rod or transfer tool, or advantageously the rod or transfer tool are guided axially into the stack of sheets as they are held stationary.

Another possibility for prealignment of the sheets is presented if the sheets, suspended on a rod, are introduced into a magazine from above, whereby on the magazine there may be a radially inwardly projecting rib which engages in an outwardly open groove of the sheets.

During the packet assembly process there must also be a guiding and aligning of the sheets. As seen along the periphery, the sheets have many different thicknesses. If a number of such sheets in alignment are stacked, the stack bends. The bend can lead to a strong transverse force to be taken up by the walls or guides of the magazine when the stack is put under pressure in the packet assembly operation. In a preferred practical embodiment of the invention, this drawback can be avoided if a hanging laterally elastically yielding magazine is used. A lateral deflection of the magazine under the tensioning pressure in the packet assembly process because of the transverse forces there occurring does no harm, because it suffices to have the sheet packet taken from the magazine from above, centered in a receiving head.

Figure 2:
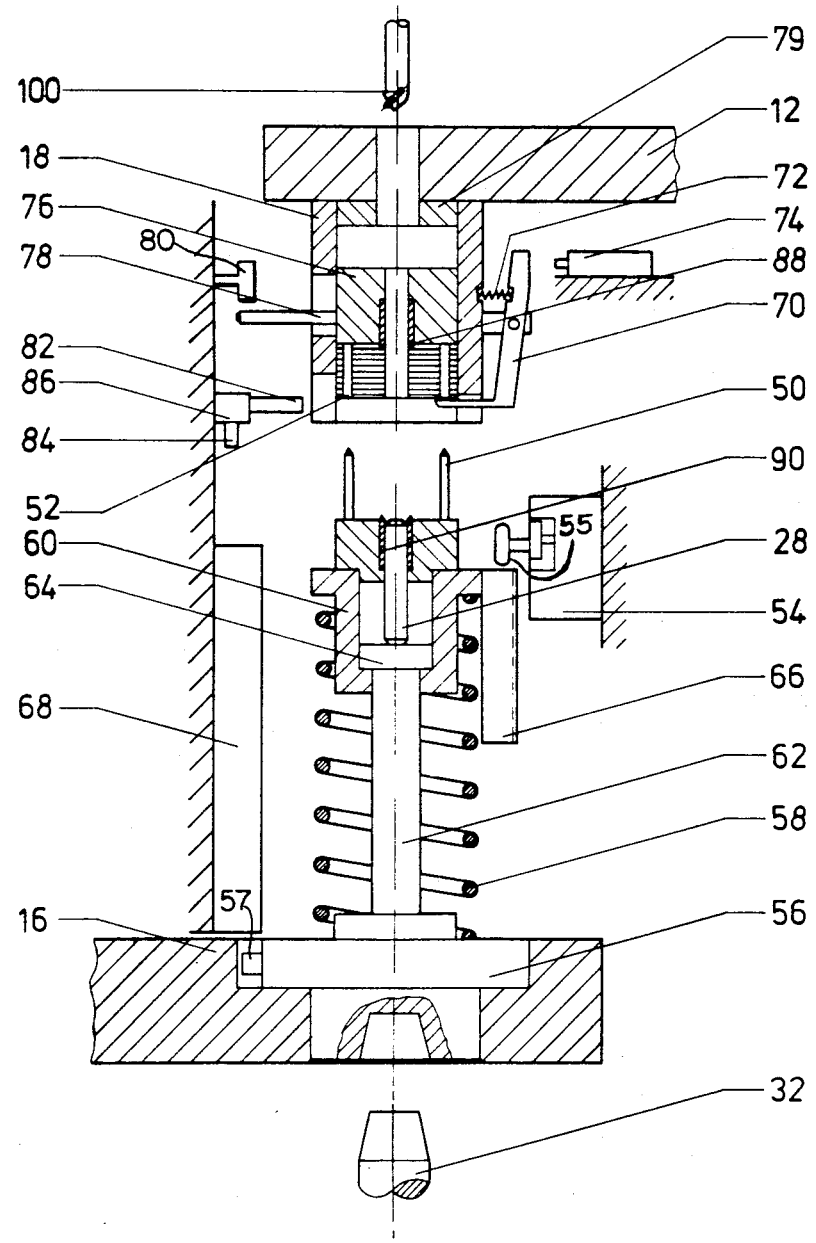
Figure 3:
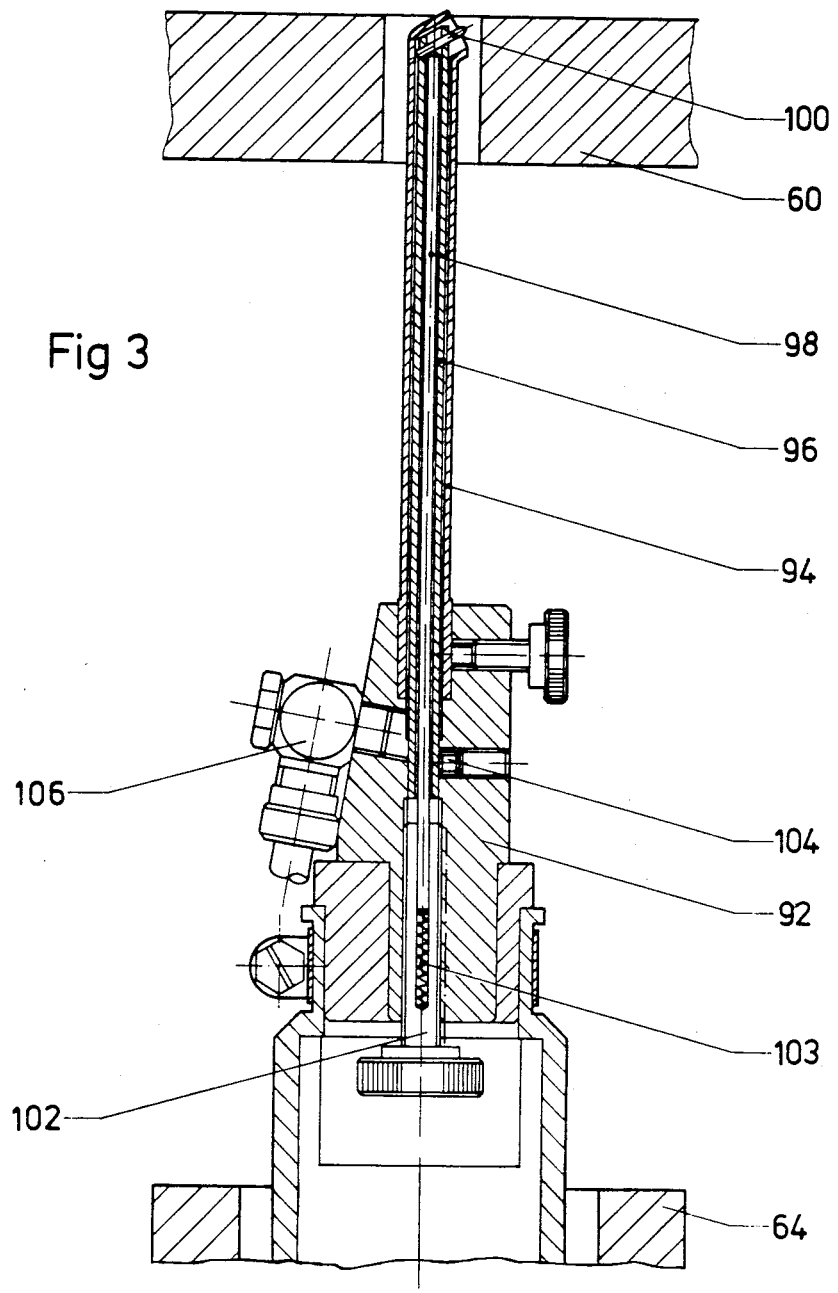

Examples of embodiments of the present invention are discussed below with reference to the drawing, wherein:

FIG. 1 shows a schematic side elevational view of an apparatus for assembly, alignment and joining of stator or rotor sheets, with parts thereof shown in cross-section for purposes of clarity, FIG. 2 is a vertical sectional view, on an enlarged scale through that portion of FIG. 1 comprising the work station for alignment and joining of the sheets, FIG. 3 is a vertical sectional view, on a scale which is enlarged relative to FIG. 2, through a welding device for joining the sheets.

The apparatus illustrated schematically in FIG. 1 comprises a base frame 10 that supports three turntables 12, 14 and 16. On turntable 12 there are at least two receiver heads 18, each of which are intended to receive a sheet packet in the number of sheets which are necessary for the stator or a rotor to be formed. By turning of turntable 12, receiver heads 18 travel between a packet receiving station, associated with turntable 14, shown on the right and an aligning and joining station, associated with turntable 16, shown on the left.

Turntable 14 supports a plurality of magazine baskets 20 in suspended arrangement distributed around its periphery, said baskets being filled outside the packet receiving station with sheets, and by the movements of turntable 14 brought in succession into the packet receiving station. Delivery of the sheets to magazine basket 20 will be described in greater detail below.

The third turntable 16 has for example two tools 22 for alignment and joining of the sheets. The tools are moved by turntable 16 between the aligning and joining station at which it cooperates with turntable 12 and a loading station at which a reciprocating push-pull device 24 removes the finished joined sheet packets 26 and transfers them to a conveyor (not illustrated), which conveyor simultaneously brings shafts 28 which are introduced by device 24 into tool 22. In order that the dispensing of the finished packets 26 and the introduction of shafts 28 can occur along a horizontal axis, while the aligning and joining of the sheets can occur along a vertical axis, the axis of rotation of turntable 16, as shown in the drawing, is disposed on a slant, and the main axes of tools 22 form an acute angle with the axis of rotation of turntable 16.

Frame 10 houses the rotational drives for turntables 12, 14 and 16. In addition, frame 10 houses the linear drive for a piston 30 which presses the sheets upward in the packet receiving station, into receiver head 18, and also for a piston 32 which thrusts tool 22 upwardly at the aligning and joining station.

The device of FIG. 1 operates as follows:

The stator or rotor sheets that are to be processed are manually or mechanically charged into magazine baskets 20. At the packet receiving station a specific number of sheets which together will constitute a specific sheet packet for a stator or rotor are received, engaged and held in receiver head 18. After the receiver head in question, with the sheet packet, has been moved by turntable 12 into the aligning and joining station, a tool 22 thereat moves upward, and by means of straight or helicoidal aligning elements effects the desired alignment of the sheets in the packet. Immediately in connection with the alignment, at the same station, the sheets are joined together. In the present embodiment joining is accomplished by pressing in of a shaft 28 into the sheet packet. The finished sheet packets are then conveyed away by rotation of turntable 16, followed by operation of device 24.

Individual work stations and the transfer devices that cooperate with them will now be described in greater detail.

It is new in the feeding of the sheets into magazine baskets 20 that in each filling operation of a magazine basket 20, which as a rule has a stack height of more than 40 cm, the basket in question is completely filled. Previously because of the weight and the difficult handling of the sheets only a small quantity was charged in so that delays in the operation were unavoidable. The idea of charging a relatively high stack of sheets into baskets 20 was believed to be undesirable because of the great weight of the high stack, at least in the case of rather large sheets. In the present invention, however, it is proposed that a mechanical auxiliary device may be useful for charging a high stack. In FIG. 1 two such devices are alternatively indicated. At A there is shown a transfer tool 34 which presents parallel guide rods extending perpendicularly from a supporting surface which can accept the necessary number of sheets. The sheets are transported lying on transfer tool 34 by means of a suitable conveyer to magazine turntable 14, in order thereby to fill a basket 20 in a single operation. In this connection, it is immaterial how the baskets are constructed or how they are charged. This can be done for example by lateral folding up of rods or wall zones of baskets 20, possibly with a slanted positioning of the baskets. Possibly the transfer tool 34 may itself be set into the magazine, or even serve as the magazine basket.

Aside from the weight of the sheets, there was previously the further difficulty in charging the magazine baskets 20 in a single work step that it was necessary to align the sheets at least approximately in the circumferential direction before the packet assembling operation in order to facilitate operation of the subsequent work steps. The sheets are delivered as stock in their initial state after the heat treatment, only as relatively high stacks held together by a long elastically flexible needle thrust through an off-center hole, and they therefore require a further manual correction. This can only be done with much difficulty, however, in the case of high heavy sheet stacks. To eliminate the difficulties connected with this operation it is proposed that the sheets seated on a needle according to FIG. 1 first be laid on a horizontal or somewhat inclined guide 36. In this position even the lower sheets are relieved of the intrinsic weight of the stack and can readily be turned individually so that the inserted needle is entirely straight. If the sheets have an external configutation with at least one corner, a groove or a projection, a corresponding configuration or guide 36 can lead to precise alignment of the sheets.

There is then the possibility of pushing the sheets from guide 36 onto the rods of transfer tool 34. Or, contra, the transfer tool 34 with its rods can be thrust into the holes of the sheets.

As opposed to the delivery of sheets by means of a transfer tool 34 which conveys the sheets lying as indicated at A in FIG. 1, the suspended transport using a rod 38 and indicated at B with automatic balancing offers advantages. The sheets can be received onto the rod 38 or even received at the stamping machine or in the reserve receptacle. There is also the possibility however that the sheets first be aligned on a guide 36 and then using rod 38 instead of using the transfer tool 34 for transfer of the sheet into magazine baskets 20. The sheets are held on rod 38 by a cam 40 disposed at its lower end, the cam being pushed radially forward and pulled back by means of a hand lever 42. Rod 38 hangs on a known arm 44, with automatic balancing, as sold for example by Karl H. Bartels KG of Hamburg Germany with the model designation Balaman BMS 55.

Advantageously, in use of rod 38 the charging of the sheets onto the magazine basket 20 occurs from above. If the sheets have an externally open groove, an engaging guide rib 46 axially engaging in this groove can be arranged on the basket, and the correcting alignment of the sheets can be done manually on guide rib 46 immediately in the transfer of the sheets from rod 38 to the basket 20.

At the packet assembly station which is over piston 30, the device works in principle like the packet assembly device described in detail in German OS No. 20 19 924, where the blade that separates the packet to be taken from the stored stack from the rest of the sheets in the magazine is shown schematically in FIG. 1, designated by numeral 48.

As distinguished from the known packet assembler, the stack of sheets held in the magazine 20 is not rigidly held and guided laterally into the packet assembly station. Only those sheets which have been thrust upward by piston 30 during the packet assembly process into the sleevelike receiver head 18, forming the packet that is to be taken off from the pile, are centered in receiver head 18. The hanging disposition of the baskets 20, which comprise radially elastically yielding rods, 17 on turntable 14 and their elastic yielding in all directions ensures that the stored stack of sheets in the packet assembly station can set themselves on a lateral slant or bend outward under the strong pressure of piston 30 without the need for the machine structure to absorb transverse forces. In the region of the sheet packet taken by receiver head 18 at the upper end of the stack, a slanted position of the sheets due to irregular sheet thicknesses is prevented in that first half the sheets of a packet that is to be formed are taken from the stack, and then receiver head 18 together with the half packet is turned by 180° before the second half of the packet is taken from the stack.

On magazine turntable 14, which may support four baskets 20 for example, there is advantageously a cross switch that blocks the drive of turntable 12 during the charging of a basket. In the illustrated arrangement three baskets 20 are accessible for loading while the fourth is in the packet assembly station.

By rotation of turntable 12, receiver head 18 transfers a packet of specific height and sheet number from the packet assembly station to the aligning and joining station which is above piston 32 in FIG. 1. This station is described in detail with reference to FIG. 2.

The sheets of the packet often have to be twisted, i.e. they have to be turned within the packet from sheet to sheet by a specific angle with reference to each other. This twisting is effected at the station shown in FIG. 2 by means of an aligning element in the form of a pin, advantageously a plurality of pins 50 which are located outwardly from the axis of the sheets, toward their periphery and bent at a slant or to the axial direction, or helicoidally, so that the desired twisting angle can be attained. Aligning pins 50 move into the packet through holes 52, whereby the sheets are threaded onto the pins. Helicoidally bent pins 50 have an advantage over slanted straight pins in that, with a specific diameter of the holes 52 in the sheets, they can have a larger diameter.

If the sheets have at least one groove open to the outside, instead of aligning pins 50 use may also be made of swordlike or rib-shaped aligning elements which are straight or helical which engage in the externally open grooves.

Only if the sheets have the externally open grooves can they be aligned ahead of time on guide 36 or on introduction into basket 20 as described above. If there are no externally open grooves, the turned and also the straight alignment in the work station illustrated in FIG. 2 occurs only by means of pins 50, whereby the said pins, for axially straight alignment are vertical and must penetrate into predetermined holes 52 in the sheets, the sheets of course being centered in receiver head 18 but held without order in the circumferential direction.

Pins 50 for this purpose have an axially advancing drive from piston 32 as well as a circumferential swinging drive 54 which moves the tips of aligning pins 50 circumferentially back and forth along an arc in a horizontal plane.

In its axially advancing movement, piston 32 engages in a coupling part 56 guided on turntable 16 which forms a lower spring bearing for a biased spring 58, the upper end of which presses against a guide head 60 which carries the aligning pins 50 on its upper side. The aligning pins may be held at different angles of inclination or adjustably in guide head 60.

Guide head 60 is seated so as to be axially displaceable on the guide rod 62 connected with coupling part 56, and it is pressed into the starting position by spring 58 which causes part of guide head 60 to engage against a stop 64 on the upper end of guide rod 62.

Circumferential swing device 54, shown only schematically, causes arcuate movement of guide head 60 back and forth around its axis. For example, a motor driven eccentric pin with a roll 55 may engage an axial guiding track or notch in a guide 66 which is fixed on guide head 60. Advantageously the width of swing of swing drive device 54 can be adjusted so that for each individual case there will be an appropriate circumferential swing distance. In order that the swing may be transmitted only to guide head 60, and not to coupling part 56, a fixed guide 68 is provided on the machine frame next to the work station, in which coupling part 56 engages with a pin 57 or the like when guide rod 62 moves upwardly.

To hold the sheets in receiver head 18, a spreading mandrel can be used in the case of stator sheets with a normally relatively large central opening, as described in said German OS No. 20 19 924. In the case of rotor sheets which often have a smaller central opening it is recommended, on the contrary, to have a retaining device effected by means of one or more external levers 70 which engage the lowermost sheet from below as shown in FIG. 2. Levers 70 can be mounted on receiver head 18 and urged into the holding position by a spring 72 for example. On the basis of a control pulse, levers 70 can be swung into the opening position by means of, for example, switch cylinders 74.

If the sheets held in receiver held 18 are to be threaded onto aligning pins 50, guide head 60 first moves upward by means of piston 32 until the free ends of pins 50 have penetrated into sleevelike receiver head 18. Then, by means of switch cylinder 74, levers 70 are drawn back radially outwardly so that the sheets can fall by their own weight onto the tips of pins 50. As a consequence of the rotational swinging of guide head 60 the tips seek out holes 52 in the sheets and the sheets then shake downwardly one after another onto the pins, whereby the individual sheets are aligned axially or twisted circumferentially in the desired way. During this process guide head 60 is steadily thrust further upwards by piston 32. If it should happen that a sheet does not thread onto pins 51 as desired, that sheet will be raised, together with the sheets above it, by the upwardly travelling aligning pin, and thrust upwards. This upward displacement is thus a sign that the aligning process is temporarily out of order. To automatically eliminate this disturbance, it is provided that a switching pulse will be triggered by the upward displacement of the sheets in receiver head 18, and this pulse will cause a temporary drop and subsequent renewed upward movement of guide head 60 so that the reciprocatingly swinging tips of aligning pins 50, with renewed upward travel, will abut against another place on the lowermost sheet which is thus relieved of load and not threaded on, and the aligning process then can resume its normal course. The retraction and subsequent resumed upward movement of the guide head 60 can be repeated as often as desired. The switching pulse necessary for it can be obtained by an arrangement, for example, whereby an outwardly projecting pin 78 can be placed on a plate 76 set in the receiver head 18 above the sheet packet, which cooperated with an electric switch 80 fixed on the machine frame. At the same time, switch pin 78 can limit the axial movability of plate 76 in a downward direction.

If a plurality of holes 62 distributed about the periphery of the sheets is available, wherein pins 50 can penetrate, and the sheets present some particular feature, e.g. sheet thickness that is greater on one side or an outer projection that is subsequently to be machined off, it is desirable to take the sheets in statistically random circumferentially distribution of the mentioned particular feature. For this purpose, a compressed air nozzle 82 can be disposed adjacent to receiver head 18, which nozzle blows an air jet tangentially against the sheet packet through a lateral opening in receiver head 18 so that the sheets, independently of each other, will rotate and then settle with random circumferential distribution of any irregularities onto aligning pins 50. The compressed air is delivered to nozzle 82 via a compressed air connection 84. The flow of compressed air can be controlled by a valve 86.

After all sheets of the packet have been seated in alignment on pins 50, circumferential swing drive 54 can be cut off while the rod 62 drive travels farther upward by means of piston 32. Thereby the guide head 60 then stops as soon as it is held against the pressed-together sheets by an upper stop 79 which engages plate 76 which has been carried along with the sheets. During this axial movement after the alignment of the sheets, the function of switch 80 is eliminated. Also, after the stopping of guide head 60, coupling part 56, guide rod 62 and stop 64 can move farther upward, with further tensioning of spring 58. This movement can be exploited to cause joining together of the sheets which have been aligned by pins 50.

In the embodiment according to FIG. 2, joining is caused by means of a shaft 28. This shaft has an external diameter which is somewhat larger than the diameter of the middle opening of the sheets. Shaft 28 is therefore forced under pressure axially into these middle openings of the sheets in the pack, and the sheets are then firmly seated on the periphery of this shaft. It is possible additionally to have small axial tooth arrangements or knurling on the periphery of shaft 28 to still further improve the connection between the shaft 28 and sheets. The pressing in of shaft 28 which has previously been accepted in a central receiving hole on guide head 60 is effected by means of stop 64 and guide rod 62, as shown in FIG. 2.

Supplementing the pressing in of shaft 28, the sheets may be peened thereafter in the immediate vicinity of the shaft, i.e., they can be plastically deformed in a locally limited area, to improve still more the firm seating on the shaft 28. For this purpose there are peening tools 88 and 90 in plate 76 on the one hand and in guide head 60 on the other, comprising sleeves with sharp teeth that project toward the sheets.

After the aligning of the sheets and the joining of the sheets by pressing in of shaft 28 and the peening of the sheets by means of tools 88, 90 guide head 60 is retracted downward, turntable 16 is turned, as shown in FIG. 1 and then at the charging station the finished sheet packet with its shaft is removed by device 24 from guide head 60 and immediately thereafter the next shaft 28 is thrust into the middle hole in guide head 60 by a means shown schematically at 25 in FIG. 1. Thus prepared, the said guide head 60 in the next switching process of turntable 16 will again be turned into the aligning and joining work station as in FIG. 2.

The sheets may alternatively be interconnected by a weld instead of by a shaft 28. It is especially suitable to have a resistance weld movable axially along the center opening through the sheet packet, done under a protective gas, whereby advantageously the welds are disposed in a small bulge of the hole, radially outward, so that later pressing in of a shaft will not be hampered by the weld.

In a first embodiment, the welding device, like shaft 28, can be introduced from below through the hole in the sheet packet. For this the welding device can be fixedly connected, for example, with stop 64 on the upper end of guide rod 62. During the aligning of the sheets the head of the welding device with the electrode then first remains retracted in the central hole in guide head 60. Only when all sheets are seated in alignment on pins 50 and the guide head 60 has come to a halt because of the upper stop 79, will the welding device be thrust farther upward by means of piston 32, and weld the sheets together. The feed of protective gas and electricity to the welding device can occur for example via piston 32, coupling part 56 and guide rod 62.

As for the structure of the welding device in detail, reference is made to FIG. 3. There a multipart housing 92 is shown which is bolted for example to stop 64. Housing 92 has a vertically upward extending outer tube 94 of heat-resistant ceramic material. In this tube there is an inner tube 96 of electrically conductive material, at a radial distance from the outer tube. This inner tube 96 is also held in housing 92. A clamping rod 98 extends through inner tube 96 and presses onto the head of the welding device against an electrode 100 which extends radially out from tube 94, the electrode being seated, for instance, in a transverse bore of inner tube 96. The pressure of tensioning rod 98 is applied via a spring 103 by means of a screw 102 which can be turned axially in housing 92 by means of a head which is accessible from the outside. Current is supplied to the electrode 100 via a connection 104, housing 92, the metallic inner tube 96 and tensioning rod 98. The protective gas is fed via a connection 106 and the annular chamber between tubes 94 and 96 to the head of the welding device. The inner tube may be replaced if tensioning rod 98 presses electrode 100 against a backup at the end of tube 94 and serves for current supply.

The described welding device permits welding in relatively small holes down to about 10 mm in diameter and in principle can be used for other purposes, as far as clamping the electrode is concerned, which has an advantageous distinction with respect to known bulky structures.

In a second embodiment the welding device could also be disposed above the sheet packet in receiver head 18, i.e. above or on turntable 12. In this case current and protective gas supply would be simpler, but on the other hand the welding device would need a special axial advance drive or a special spring construction above plate 76, to take the welding electrode through the hole of an aligned pressed-together sheet packet (see FIG. 2).

Finally, there is also the possibility of disposing the welding device on piston 32 and allowing it to extend upward through a hollow guide rod 62. In this case of course the tubes of the welding device would have to be somewhat longer, but on the other hand, the supply of current and of protective gas would be managed more simply.

Although the invention has been described in considerable detail with respect to preferred embodiments thereof, it will be apparent that the invention is capable of numerous modifications and variations, apparent to those skilled in the art, without departing from the spirit and scope of the invention.

I claim:

1. In an apparatus for making rotor or stator sheet packets, a sheet receiving means comprising a turntable with a plurality of magazine baskets suspended therefrom, connecting means for connecting the baskets to the turntable, each basket having generally vertical wall means, said wall means comprising radially elastically yielding rods which are laterally elastically yieldable to absorb transverse forces exerted by the sheets when an upward force is exerted on the sheets from below, a piston located below the turntable, said piston being movable upwardly through a magazine basket located thereover for urging the sheets upwardly, a head means positioned above the turntable, wherein the laterally, radially yielding rods absorb lateral forces when the piston urges the sheets upwardly, compressing the sheets between the piston and the head means.

2. An apparatus according to claim 1, said head means including a receiving head located above the turntable and above the piston, said receiving head thus being positioned to receive sheets from the basket when urged upwardly by said piston.

* * * * *